United States Patent [19]

Bain, Jr. et al.

[11] Patent Number: 4,853,849
[45] Date of Patent: Aug. 1, 1989

[54] MULTI-TASKING REGISTER SET MAPPING SYSTEM WHICH CHANGES A REGISTER SET POINTER BLOCK BIT DURING ACCESS INSTRUCTION

[75] Inventors: William L. Bain, Jr., Beaverton, Oreg.; Marcos de Oliveira Camargo, Lodi, Calif.; Robert C. Duzett, Hillsboro, Oreg.; Artur H. Lederhofer, Herzogenaurach, Fed. Rep. of Germany; Craig B. Peterson, Portland; John L. Wipfli, Hillsboro, both of Oreg.

[73] Assignee: Intel Corporation, Santa Clara, Calif.

[21] Appl. No.: 942,608

[22] Filed: Dec. 17, 1986

[51] Int. Cl.$^4$ .............................. G06F 9/28
[52] U.S. Cl. .................. 364/200; 364/246.3; 364/247; 364/247.7; 364/247.3
[58] Field of Search ... 364/200 MS File, 900 MS File

[56] References Cited

U.S. PATENT DOCUMENTS

| | | | |
|---|---|---|---|
| 3,651,482 | 3/1972 | Benson et al. | 364/200 |
| 3,760,365 | 9/1973 | Kurtzberg | 364/200 |
| 4,084,228 | 4/1978 | Dufond | 364/200 |
| 4,099,229 | 7/1978 | Kancler | 364/200 |
| 4,320,453 | 3/1982 | Roberts et al. | 364/200 |
| 4,403,285 | 9/1983 | Kikuchi | 364/200 |
| 4,460,061 | 8/1984 | DeSantis | 364/200 |
| 4,493,020 | 1/1985 | Kim et al. | 364/200 |
| 4,511,964 | 4/1985 | Georg et al. | 364/200 |
| 4,661,900 | 4/1987 | Chen et al. | 364/200 |
| 4,727,510 | 2/1988 | Scheuneman | 364/900 |
| 4,733,346 | 3/1988 | Tanaka | 364/200 |
| 4,758,948 | 7/1988 | May et al. | 364/200 |
| 4,777,588 | 10/1988 | Case et al. | 364/200 |
| 4,791,566 | 12/1988 | Sudama | 364/200 |
| 4,794,515 | 12/1988 | Hornung | 364/200 |

Primary Examiner—David Y. Eng
Assistant Examiner—Eric Coleman
Attorney, Agent, or Firm—Owen L. Lamb

[57] ABSTRACT

An I/O processor includes an execution unit (EU), a register file, an I/O bus sequencer and a local bus sequencer. The EU decodes an ACCESS instruction having a pointer to a parameter register comprised of: a number of fields for storing a sequencer code identifying one of the sequencers; a logical byte specifying a location in memory to be addressed and valid and block bits; a reply register set pointer to a register set in the register file designated to receive a reply to the ACCESS instruction; and, a length field specifying the location and length of a data block in the register file from which data is to be obtained. A data pointer is generated by taking the logical byte in the parameter register and passing it through a register set mapper to produce a register file physical address. The valid bit of the logical byte is turned off as it is translated by the register the mapper so that the bus sequencer can take control over the corresponding register set. The block bit is set upon the condition that the ACCESS instruction attempts to access a register set whose valid bit is not set, and the block bit is reset upon the condition that the task which is executing the ACCESS instruction attempts to access a register set whose block and valid bits are set.

3 Claims, 3 Drawing Sheets

MULTI-TASKING REGISTER SET MAPPING SYSTEM WHICH CHANGES A REGISTER SET POINTER BLOCK BIT DURING ACCESS INSTRUCTION

CROSS-REFERENCES TO RELATED APPLICATIONS

Copending patent application Ser. No. 046,633, U.S. Pat. No. 4,803,622 filed 05/07/87, of Cox, et al, entitled "Programmable I/O Sequencer For Use In An I/O Processor" and assigned to Intel Corporation.

Copending patent application Ser. No. 921,313 filed 10/21/86, now abandoned of Cox, et al, entitled "Memory-based Interagent Communication Mechanism" and assigned to Intel Corporation.

BACKGROUND OF THE INVENTION

1. Technical Field

The present invention relates to data processing systems, and more particularly to apparatus for executing instructions which control data flow between a computational subsystem and an I/O subsystem.

2. Background Art

Copending patent application Ser. No. 921,313, now abandoned addresses the basic I/O problem of how to couple two different bus types. On the I/O bus different devices having a spectrum of data rates generated by different peripherals are handled by the bus. Some devices have the added problem of quiet periods followed by very busy periods with sharp transitions between the two. This problem is solved by providing a processor bus sequencer, an I/O bus sequencer, and an execution unit, all of which operate asynchronously and share a common register file memory.

Copending patent application Ser. No. 046,633, U.S. Pat. No. 4,803,622 describes the I/O bus sequencer. The I/O bus sequencer is connected to the I/O bus and to the register file. The register file is uniformly addressed and adapted to be shared by the execution unit, the system bus sequencer and the I/O bus sequencer. The register file is comprised of a plurality of multiported register sets.

The present invention is concerned with the execution unit which controls the remainder of the system described in the above-identified patent applications. In modern VLSI technology, there are limits on clock rate, chip area and power consumption that must be considered in order to achieve high performance. These limits can be dealt with by designing parallelism into the apparatus, and for the execution unit this means the ability to handle several tasks at one time.

It is therefore an object of the present invention to achieve parallelism in an I/O channel processor by providing an execution unit that supports multi-tasking.

SUMMARY OF THE INVENTION

Briefly, the above object is accomplished in accordance with the invention by providing an execution unit which includes a programmed processor having means for allocating register sets among tasks running on the processor by passing register set descriptors between the tasks in the form of messages.

In accordance with an aspect of the invention, register set locking is provided to allow tasks to pass register sets (buffers) between servers, wherein a server may be one of a plurality of tasks or a bus sequencer, a server being an agent that acts upon a register set.

The invention has an advantage that by partitioning the register file into register sets, each task can have several sets. Some of the sets can then contain private state data and always be assigned to a particular task, while other sets can be used as buffers or messages and can be passed between tasks.

Register set locking has the advantage that tasks can share register sets (e.g. for pipelined algorithms) while assuring that multiple tasks do not manipulate the same register set at the same time.

BRIEF DESCRIPTION OF THE DRAWINGS

The foregoing and other objects, features, and advantages of the invention will be apparent from the following more particular description of the preferred embodiments of the invention as illustrated in the accompanying drawings, wherein.

DESCRIPTION OF THE PREFERRED EMBODIMENT

Execution Unit (EU)

Figure 1:
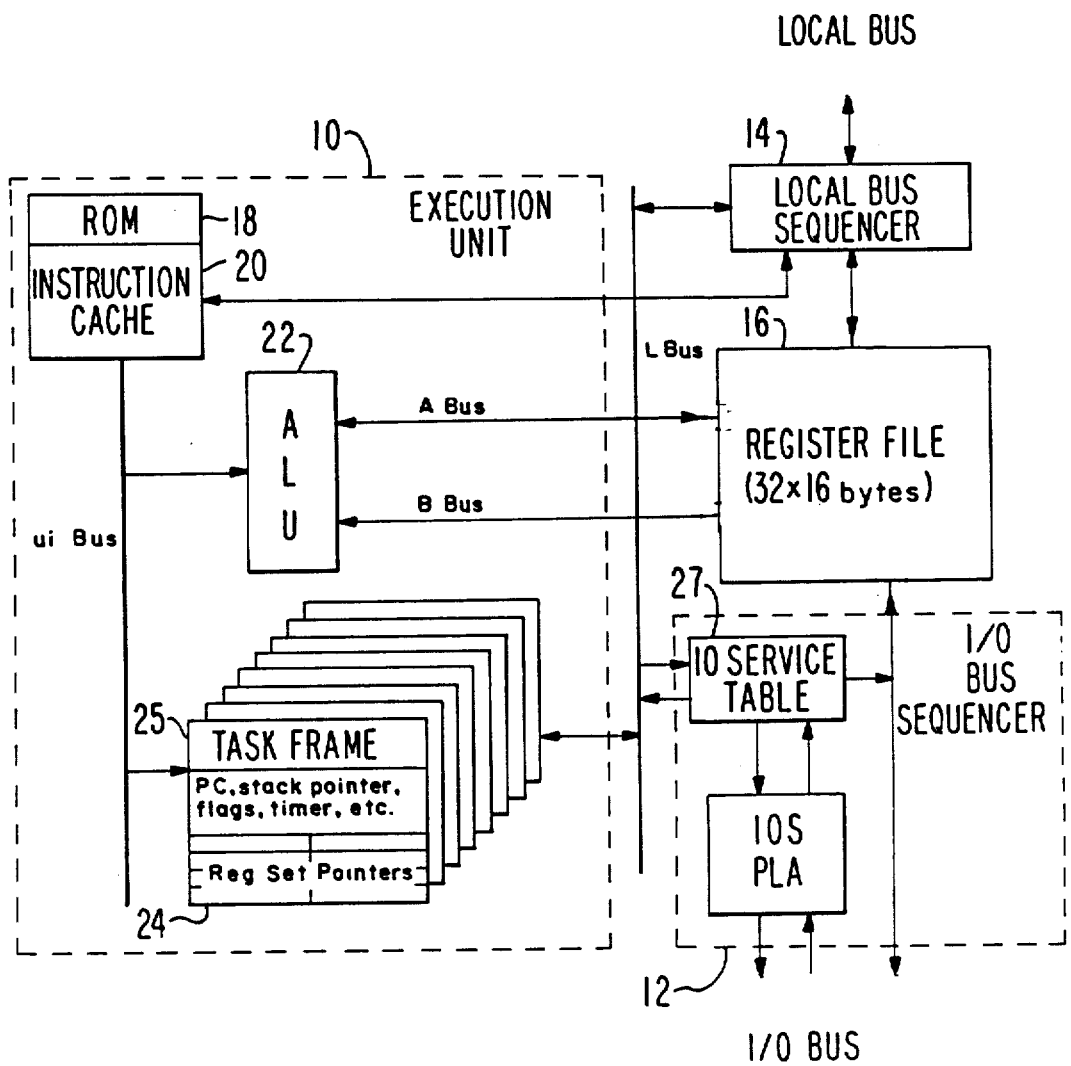
FIG. 1 is a functional block diagram of an I/O channel processor in which the present invention is embodied.

Refer to FIG. 1. The execution unit (10) executes programs which manage the transfer of data across the channel processor (CP). It provides for multitasking which simplifies the control of data transfers and background functions, such as interfacing to the computational subsystem (CS) on the local bus and the I/O subsystem on the I/O bus.

Address Spaces

The EU has five logical address spaces: the instruction space, a general register space, a CS data space, an I/O space, and a local register space.

Instruction Space

The EU's instruction space is 64k instructions. The lower 1.5k is in an on-chip ROM and contains the common subfunctions that make up the CP kernel. The upper part extends from locations 1.5k to 64k and is dynamically cached from the CS memory.

All tasks share the same 64k instruction space. Physically the CP has one fixed instruction area that is locked in CS memory. Code for all tasks must reside inside that area, which lies on a 4 Kbyte boundary in the address space of the CS memory. The location of the fixed code is given to the CP in system memory.

General register space

Figure 2:
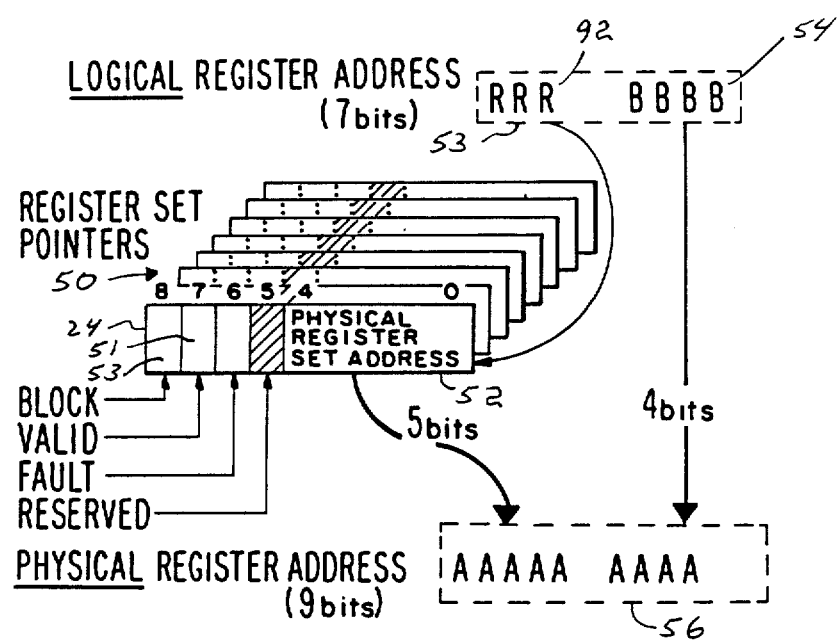
FIG. 2 is a diagram illustrating address indirection using register set pointers.

Each task can access up to thirty-two 33-bit general registers (the 33rd bit is for tags) in its general register space. The space is organized into eight four-word groupings called register sets. Each register set is accessed indirectly through register set pointers (FIG. 2). Data in the general register space can be manipulated as bytes, half-words (16 bits) or words, and all data must be aligned on its natural boundaries.

CS data space

The computational subsystem (CS) data space can be up to four gigabytes long. The space is accessed via the ACCESS instruction, which uses entries in the register file (16) to build a physical address. The ACCESS instruction implements data transfers between general registers and CS memory.

I/O space

The address space on the I/O bus side of the CP is linearly addressable and can be up to sixteen megabytes long. It is also accessed using the ACCESS instruction. This instruction uses registers in the register file for address computation, and implements data transfers between general registers and I/O devices.

Local register space

The local address space provides access to several types of storage, including:

special CP registers that are not usually accessed by microcode, e.g., the instruction cache's address table entry; and, otherwise inaccessible CP storage areas, e.g., the task frame registers.

Registers in the local address space are accessed using the ACCESS LOCAL instruction.

Register File

The CP has a set of on-chip general purpose registers contained in the register file. The register file (16) is a RAM containing one-hundred-twenty-eight 33-bit locations. These 128 registers are organized as thirty-two 4-word register sets.

Refer to FIG. 2. These register sets, and the data within them, are accessed indirectly by a logical address (54) through the register set pointers (50, FIG. 2) of each task. Registers are therefore addressed logically rather than physically. Register addresses are specified to byte granularity where appropriate. Instructions assume that half-word and word operands are located on appropriate boundaries.

Register set pointers

Referring to FIG. 2, register sets may be dynamically or statically allocated to a task by loading the physical register set address RRR (54) into one of the task's register set pointers (50). Register set pointers provide the mechanism for mapping between logical addresses (54) that are used in the instructions and physical register set addresses (56). Each task has eight register set pointers (50). These pointers are accessible in the local space. Their format is shown in FIG. 2. The bottom six bits (0-5) contain the physical address (52) of a register set in the register file (16) of FIG. 1. The top three bits (6-8) are used for access control.

The fault bit (6) gets set when a sequencer (12 or 14 of FIG. 1) has had a problem operating on a register set. For example, if the local bus sequencer (14) is supposed to load a register set with 16 bytes and for some reason can only put 9 in it, the sequencer will set the faultbit before passing the register set to the destination task. If a task tries to access a register set whose faultbit is set, then the hardware will raise a context level fault.

The Valid bit (7) indicates that the register set pointer contains a valid address and is also used in an exclusion mechanism that is described below.

The Block bit (8) is set when a task tries to access a register set whose valid bit (7) is not set. This block bit indicates to the hardware which register set the task is blocked on. When the blocked register set pointer is updated and the valid bit is set, the task will be unblocked if the block bit for that register set is set.

The MOVE POINTER instruction allows register set pointers to be loaded and stored. This instruction is used primarily when doing message based register set passing.

Register set locking

When used herein, the terms "task" and "server" will be used interchangeably. A "server" is defined herein as an agent that acts upon a register set. A server may be one of the eight tasks or a bus sequencer.

Any server (e.g. task) that tries to access a register set through one of the register set pointers (50) whose valid bit is reset will block. This mechanism is provided to control access to register sets for tasks that are passing the register sets between themselves.

Valid bits are set and reset by instructions that logically pass a register set from one task to another. The sending task's register set pointer valid bit is reset, and the destination task's register set pointer valid bit is set. Valid bits are also reset by the ACCESS instruction and set by register set replies from the bus sequencers, thus providing register set synchronization between the EU and the sequencers.

Stack Operations

The hardware supports a stack for each of the eight tasks (0-7). The stacks are located in the logical register space of the tasks. The stacks are accessed through a stack pointer which is located in the tasks' task frame registers (25). Task frame registers are more fully described in the above-identified copending application Ser. No. 921,313. The stack pointer contains a logical address that points to a half word in the register file.

Every entry on the stack is a half word. When a call instruction is executed, the stack pointer is decremented and the program counter (PC) is pushed onto the stack. When a return occurs, the stack pointer is incremented. The stack can range over the entire logical register space of the task. The stack wraps around in the logical space of the task if the pointer is incremented or decremented beyond the range of logical addresses.

The stack can be used to hold 16-bit values, such as fault handler addresses. The Push and Pop instructions move data between the register file and the stack updating the stack pointer appropriately.

Typically the stack pointer will be initialized to point to the high end of the task's register space (i.e. the last half word in logical register set 7).

Included in the stack architecture is a top-of-stack register which contains a copy of the contents of the top entry of the call stack. This register provides a performance optimization for the return instruction, acting as a cache for the stack.

Instruction Set Architecture

The EU's instruction set is partitioned into the following groups:
register operation instructions
flow control instructions memory and I/O access instructions
task control instructions
Inter-Task Communication instructions
other instructions.

These instruction groups are described below.

Register Operation Instructions

Register operation instructions include all instructions that use the ALU (22) in manipulating register operands. These instructions perform an operation with the source and destination operands and place the result in the destination. ALU operations can be performed on 8, 16, and 32 bit quantities.

ARITHMETIC OP—This instruction performs arithmetic on its operands. These operations include add, subtract, multiply, compare, and shift left and shift right. Most operations can be performed using either signed or unsigned arithmetic, setting or not setting flags.

LOGICAL OP—This instruction performs logical operations on its operands. These operations include, AND, OR, XOR, etc.

BIT OP—This instruction provides two functions. The first is the ability to test, set, or clear any single bit within an operand of any type. The second is the ability to perform an indivisible test-and-set operation on a bit, thus providing a binary semaphore to implement critical regions.

ROTATE—This instruction rotates a 32-bit destination operand by the desired number of bit positions. The source operand contains the number of bit positions and the instruction specifies left or right rotation.

LOAD LITERAL—This instruction loads a 16 or 32 bit destination operand with a 16 bit value.

Flow Control Instructions

Flow control instructions are those that cause the instruction stream to branch.

BRANCH and CALL—These instruction's target addresses are encoded in the instruction. Branch or call may be specified to be conditional, in which case the branch will occur only if the operation flags are set properly. Call instructions also cause the return address to be pushed on the task's call stack.

CASE—This instruction's target address is computed at runtime. The instruction contains a base address, and the operand specifies an offset from that address. Case instructions always take the branch.

RETURN—This instruction causes a branch to the address contained in the top of the task's call stack. The return instruction pops the call stack.

RETURN FROM DEBUG—This instruction is identical to the return instruction except that the ICE mode is reset as the return is executed.

EXCEPTION—This instruction is used to invoke the exception mechanism of the CP. Tasks are able to raise context level exceptions using this instruction. The instruction causes the task to branch to the software defined fault branch address. The branch to the fault handler is implemented as a call and thus pushes the return address on the call stack.

DEBUG BREAK—This instruction is the programmer's way to enter ICE mode. The instruction has two modes, conditional and unconditional. Unconditional Debug Break always causes a processor level fault and the CP enters the ICE mode. Conditional Debug Break will cause the CP to enter ICE mode if the TRACE ENABLE flag is set.

ACCESS Instruction

A task moves data between its register file and data storage locations in memory or on an IO device (via either the local bus or the I/O bus) using the ACCESS instruction. This instruction will move from 1 to 16 bytes of data. The sending task can specify which task is to be notified when the operation is complete. The destination task can be notified using Register Set based synchronization or Message based synchronization.

The supply variant of the ACCESS instruction is used for block moves on the I/O side.

| ACCESS Instruction Definition | |
|---|---|
| | 76543210987654321098765432l0 |
| FORMAT: | ---S---MLPISSSSSSSIDDDDDDD |
| FIELD DESCRIPTIONS: | |
| IDDDDDD | full word parameter reg., word aligned |
| ISSSSSS | 8-bit literal displacement or register containing full-word displacement |
| L | indicates literal displacement |
| P | indicates physical addressing (no address calculation); the displacement operand is used as the physical address and the BBBBB field of the parameter register is ignored |
| M | reply type - register set mapper (0) or microport (1). This bit is ignored for accesses to the local bus. |
| S | indicates a supply instruction (1 = supply, 0 = access). Supply may only be used for accesses to the I/O side. If S is asserted, P and L must also be asserted. |
| | 10987654321098765432109876543210 |
| PARAMETER REG FORMAT: | MFFFEEEERRRBBBBBCCCCLLLLOAAAAAAA |
| EEEE | Bus sequencer channel (0-9 are I/O BUS channels, 14-15 local bus channels) |
| MFFFRRR | logical pointer to register set receiving the reply (MFFF = frame id (M=0 means my task). RRR = register set) |
| BBBBB | pointer to register word containing base address |
| LLLL | length of access (# bytes - 1) |
| CCCC | spec or command bits |

| -continued | |
|---|---|
| ACCESS Instruction Definition | |
| AAAAAAA | logical address of data block in current task frame (address of first byte) |

The local bus access spec CCC bits are encodes as follows:

| CWPR | Operation |
|---|---|
| -100 | Write |
| -000 | Read |
| -101 | RMW Write |
| -001 | RMW Read |
| -110 | prefetch write (prefetch set-up) |
| -010 | prefetch read |
| 1--- | any of the above, cachable |
| 1011 | Unlock Request |

C — Cachable- which indicates that the data referred to can be located in a cache external to the CP.
W — Write.
P — Prefetch- which indicates that the access may use a prefetch channel of the Bus Expander Unit (BXU) (or other component external to to the CP) that provides such channels.
R — RMW- Read modify write.

The encodings of the I/O command bits (CCCC) are defined by the programmer of the I/O sequencer PLA for a given I/O bus application.

The ACCESS instruction causes a request to the specified bus sequencer unit and thereby creates a request/reply channel between the CP and an agent on the attached bus. The location and length of the data block in the register file (16) is indicated in the parameter register field LLLL of the ACCESS instruction. The data block location is a logical register address and is translated by the hardware into a physical address before being passed to the bus sequencer.

As it is translated, the logical register set pointer (24) in the register set mapper is invalidated, since the bus sequencer now has control over the register set. See FIG. 5. The parameter register (42) also contains the address BBBB of a base register (86) in the register file. The base is used for base/offset addressing and indicates what page or segment in memory is to be addressed. The index CCCC field of the parameter register is the index into the I/O service talbe (27), service queue ID (82), or LB sequencer, thus indicating one of the ten available I/O channels on the I/O bus or three system memory channels on the local bus.

| EEEE | |
|---|---|
| 0000 | I/O service table line 0 |
| 0001 | I/O service table line 1 |
| ,, | ,, |
| ,, | ,, |
| 1001 | I/O service table line 9 |
| 1010 | latent IAC channel |
| 1011 | Reserved |
| 110- | Reserved |
| 1110 | LB sequencer (system memory, cacheable) |
| 1111 | LB sequencer (system memory) |

The address displacement is located in the ISSSSSS register of is an 8-bit literal (94) included in the instruction (ISSSSSSX). The displacement (87) is added (89) to the segment's base (86) obtained from the register file with word address BBBBB to get the physical address. The CCCC field (88) in the parameter register more fully specifies the type of access operation to be performed (read, write, rmw, etc.).

The parameter register (42) also contains the frame ID (80) of the task that will receive the replay and the logical register set (84) belonging to that receiving task, that will be validated on the reply and will contain the specified data.

Two separate and different reply mechanisms are available to the programmer. One mechanism writes the physical data pointer into the specified logical register set pointer of the reply task, at the same time validating that pointer. This "reply to register set mapper" mechanism is described as follows:

The physical register address of the reply data will be explicitly written into the specified logical register set pointer of the reply task. The logical pointer is validated so that the reply task specified will be given full access to the register set. Thus, control of a register set can be passed from the task that requested the access to another task that will perform other processing on the register set when the access is done. In this way, a pipeline of tasks may be constructed such that each manipulates the data in a register set and then passes it on to a bus sequencer or to another task.

If the sequencer encountered a fault or other abnormal condition, the fault bit of the register set pointer will be asserted as part of the reply.

Figure 3:
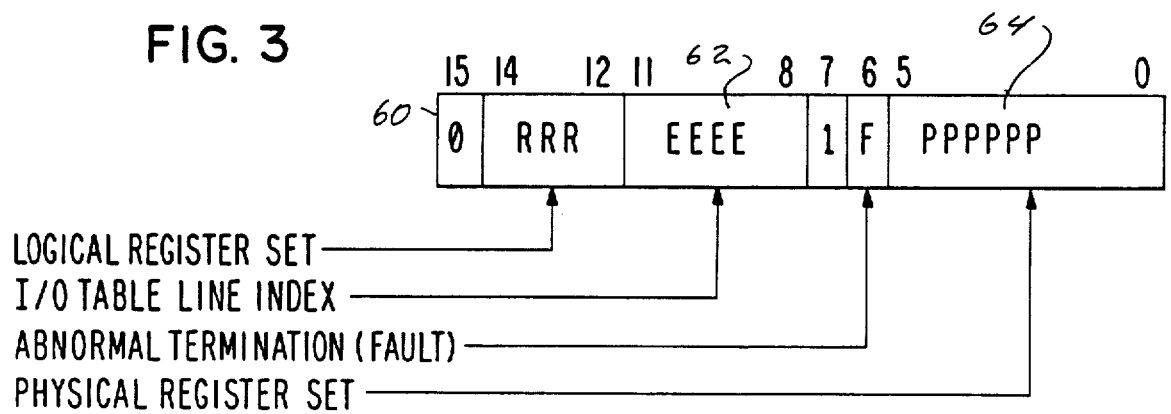
FIG. 3 is a diagram of the format of a reply message as delivered to a microport.

Refer to FIG. 3. The second replay mechanism sends a reply message to the microport of the indicated reply task, buffering the message at the bus sequencer until the message is deliverable. The delivered message includes both the physical data address (64) and the logical register set address (62).

The reply message (60) as delivered to the microport is formatted as shown in FIG. 3.

The same task pipelining mechanism that is available in the first reply scheme is also applicable here. If pipelining is not implemented, the current task may of course be specified as the reply task (by setting MFFF=0---), in which case the reply logical register set is assumed to be the same as that in the logical data pointer (AAAAAA). In other words, the FFF and RRR fields of the parameter register are ignored if M=0.

A special version of the ACCESS instruction is implemented for accesses that merely supply a register set to an I/O service table line and do not require an address computation ("supply register set" access). This version is specified by the "S" bit (supply variant) in the ACCESS instruction. It is executed without any access to a base register or any address computation.

Simple physical addressing is enabled by the "P" bit of the ACCESS instruction. If enabled, no base/offset calculation is performed. The physical address is instead taken directly from the displacement operand.

An attempt to cross a register set boundary will not be detected at the time the ACCESS instruction is executed.

However, the hardware will not cross the register set boundary, but will wrap around within the register set.

A faulted register set accessed either through the instruction or the parameter register will fault the instruction. A faulted I/O table line will cause a supply instruction to fault.

An invalid register set will block the task. Also, the current task will block if the specified service table entry or LB bus queue is full. When the line or queue becomes available, the task will unblock and execution will resume at the ACCESS instruction.

If the "supply register set" form of the ACCESS instruction is specified (that is, S=1), an address need not be supplied. Indirection on the displacement or the parameter register or both adds one extra cycle. An arbitrary number of additional cycles may pass due to arbitration for the local bus, which transmits the access request to the bus sequencers. This arbitration is necessary because asynchronous events are also transmitted on the bus (i.e. access replies).

Task Control Instructions

Task control instructions provide means for checking and controlling the status of a task.

SET STATUS—This instruction allows the schedulable and fault mode bits in a task frame to be set or reset. If the operation sets the fault mode bit the selected task will also branch to the software-raised fault branch address.

Inter-Task Communication (ITC) Instructions

The SEND and RECEIVE instructions allow tasks to communicate between themselves. Communication is achieved by passing messages to tasks' microports.

Other Instructions

A brief description of the other instructions is given below.

NOP the NOP instruction performs no operation and changes no state. It always executes in one cycle.

PUSH This instruction pushes a value onto the stack. The value can either be a literal or a 16-bit value from the register file.

POP This instruction pops the top entry from the stack.

ACCESS TAGS—This instruction is used to manipulate the tag bits in the register file. The four tag bits in a register set (i.e., the 33rd bits of the four words in the register set) can be loaded (or stored) from (to) a byte specified in the instruction.

TIMER OP—The timer Op instruction controls the operations of a task's timer. It provides functions for loading, starting, stopping, and storing the timer. The instruction can also cause (optionally) the task to block until the timer expires.

MOVE POINTER—This instruction moves data between a task's register set pointers and the register file. It is primarily used in message bsed synchronization.

ACCESS LOCAL—This instruction provides the programmer access to the interconnect and local register space. It allows data to be moved between local registers and the register file.

TEST RESOURCE—This instruction finds the index of the most significant 1 in a byte. A 'test resource' executed on that byte will return a value that corresponds to the first available resource. It is useful for resource allocation, where each bit in a byte signifies the availability of some resource.

LOAD CACHE—This instruction allows lines in the cache to be preloaded. The programmer specifies an address that should be in the cache, and the line containing that address will be fetched. The line containing the specified address can be optionally locked or unlocked.

READ INSTRUCTION—This instruction loads instructions into the register file. The programmer specifies the instruction address and a 32-bit destination register, and the instruction at that address will be put in the register file. This works for instructions that are in the ROM and cache as well as external instructions. It is useful for component testing.

Addressing modes

Most CP instructions are constructed to have two operands, the source and the destination. All operands come from the register file. All register operands may be accessed indirectly.

The instructions contain operand specifiers that are of the form ISSSSSSS or IDDDDDDD. These operand specifiers can reference an operand in one of three ways, literal, direct or indirect literal. If the instruction designates a literal operand then the operand specifier will be used as an eight bit literal.

Direct operands have I=O and the rest of the field is interpreted as a logical address. Instruction that use word sized operands (4-bytes) must have the bottom two bits of the operand specifier equal to zero. Halfword operands must have the bottom bit equal to zero.

Figure 4:
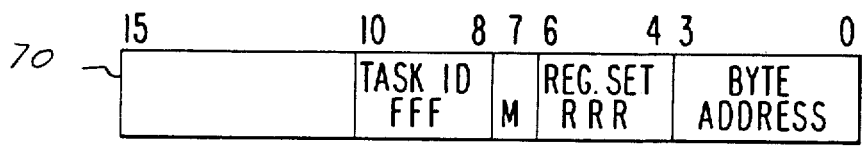
FIG. 4 is a diagram of the format of logical addresses in a register file.

When an instruction has an indirect operand I=1, the operand in the instruction points to a halfword in the register file that is the logical address of the operand. The format of the logical address (70) in the register file is shown in FIG. 4. Some instructions that only use full word operands have operand specifiers of the form ISSSSSO instead of ISSSSSOO because they allow indirect addresses which are halfword pointers.

Logical addresses used in indirection must always be halfword aligned if the M bit (bit 7 shown in FIG. 4) is a 1. If the M bit is a zero then the upper half (bits 8-15) of the half-word will be ignored and the current task's register set pointers are used; otherwise the FFF bits (task ID) tell which task's register set pointers to use when resolving the address. The RR bits (4-6) tell which of the the tasks eight register set pointer to use and the bottom four bits (0-3) give the byte address within the register set.

Instruction Cache Operation

The instruction cache (20), shown in FIG. 1, holds 256 instructions. It does fully-associative address mapping, with 32 address blocks, 2 lines per block and 4 instructions per line. Each instruction is 28 bits wide, but when in main memory, it is placed in a 32 bit word with leading zeros.

Management of the instruction cache is transparent to the tasks once the initial binding between the instruction segment in the CS memory and the cache has been completed. When a task has a cache miss, the task is blocked until the line containing the instruction is fetched from CS memory. Other tasks may execute during this time. When the cache line has been fetched, the task is unblocked.

Prefetch

Cache lines are prefetched using a strategy called 'tagged prefetch within an address block'. This means that the second line in an address block will be prefetched as soon as the first line has been accessed once.

Prefetch will not occur if the cache request queue is full.

Line Locking

Certain applications may require that their code be completely in the cache and always available, before and while it is executed. Time critical transfer loops are an example. The LOAD CACHE instruction allows a programmer to load a line containing a particular instruction and optionally lock it in the cache. The same instruction is used to unlock the line. Locked lines will not be replaced.

Local Bus and I/O Bus Sequencers

There are two modules to accomplish communication with other devices: the Local Bus Sequencer (LBS) and the I/O Bus Sequencer (IOS), shown as blocks (14) and (12) in FIG. 1. They facilitate communication with the Computational Subsystem (CS) and the I/O subsystem respectively.

The following steps occur to effect a transfer (Note: the third and fourth steps may occur in the opposite order than listed here):
1. The EU executes an ACCESS instruction. This issues a request to one of the sequencers (12 or 14). The task may block until the sequencer can accept the request.
2. The sequencer performs the requested operation. This usually results in data being transferred into or out of the register file (16).
3. A task executes an instruction which blocks until the sequencer signals completion. This task may or may not be the task that issued the request.
4. The sequencer signals the completion of the operation.
5. The task unblocks and resumes execution at the synchronizing instruction.

Figure 5:
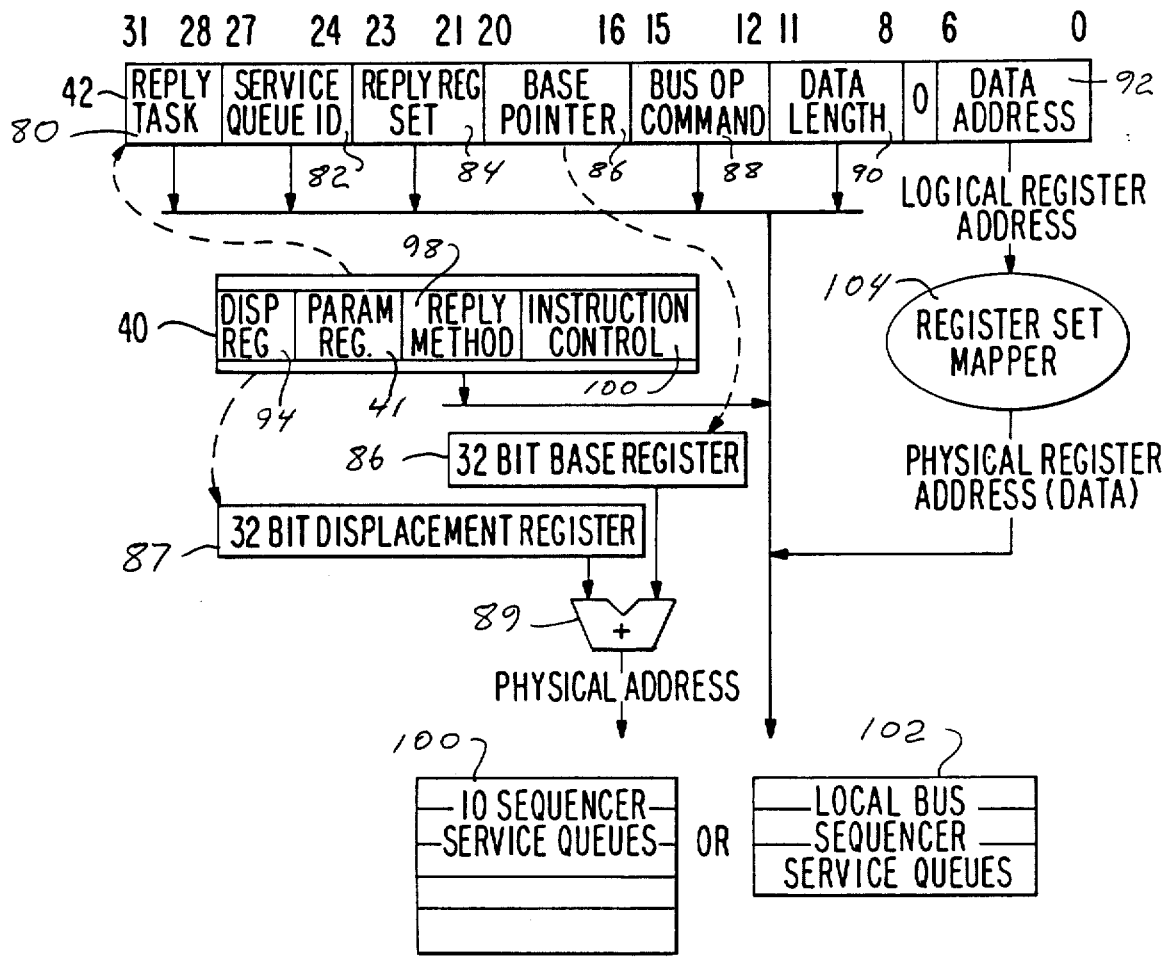
FIG. 5 is a diagram illustrating the ACCESS instruction operation.

The ACCESS instruction, described above, is the EU's vehicle for making requests to the IOS (12) and the LBS (14). FIG. 5 shows a typical ACCESS instruction (40) and parameter register (42) and how the information needed by a sequencer (100 or 102) is generated. The ACCESS instruction (40) provides the necessary information to either sequencer so that the sequencer can do the data transfer. The information provided is:
  sequencer code
  reply method
  supply variant (only for the IOS)
  length
  command
  reply task
  reply register set
  physical address (32-bit for LBS; 24-bit for IOS)
  data pointer The sequencer code, service queue ID (82) informs the hardware which sequencer the access is bound for. Codes from 0 to 9 specify a line in the I/O Service Table (100). Codes 14 and 15 are to the LBS (102) and are defined below. The reply method bit (98) tells the sequencer how to signal the completion of a request. The supply bit is used only by the IOS (it is ignored by the LBS). It tells the IOS that the access is part of a block transfer.

Length (90) tells how many bytes to move in the transfer. Command (88) tells the sequencer what it is supposed to do. Reply task (80) tells which task is to be replied to. Reply register set (84) tells which register set in the reply task is to be replied to. The physical address is the location on either side of the CP where the transfer will begin. The data pointer is the register file physical address of the first byte of data.

The information described above is generated from parameters and fields of the ACCESS instruction. The instruction (40) contains a pointer (41) to a 32-bit parameter register (42) which holds some of the information necessary for the sequencers.

The first six pieces of information described above come directly from either the instruction (40) or the parameter register (42). The data pointer is generated by taking the logical byte in the parameter register and passing it through the Register Set Mapper (104) to produce a register file physical address.

The 32-bit physical address needed by the sequencers can be generated in three different ways. FIG. 5 shows the physical address being generated by adding (89) a 32 bits displacement (87) to a 32-bit base address (86). The pointer to the displacement register is in the instruction (40) and the pointer to the base address is in the parameter register (42).

The physical address can also be generated by using the pointer (94) to the 32-bit displacement register as a literal value. This 8-bit literal value is added to the 32-bit base address (86), allowing positive literal displacements up to 255.

The third way is direct physical addressing. The base pointer (86) in the parameter register (42) is ignored and the 32 bit value (87) in the displacement register or the 8-bit literal (94) is used as the physical address.

The way the physical address is generated is chosen by bits in the ACCESS instruction. If a sequencer cannot accept an access request, the ACCESS instruction will block and will be retired when the sequencer can accept a request.

The ACCESS instruction always locks the logical register set that the task is passing to the sequencer. This keeps the task and the sequencer from both operating on the register set at the same time.

Bus Sequencer to EU Synchronization

There are two methods for synchronizing transfers between the bus sequencers and the EU: register set locking and microport messages. Selection of the desired method is made by the EU code that issues the ACCESS instruction for a particular bus operation. The supply variant can not change the method, so a particular data streameither uses register set locking or microport messages, not both.

Message Based Synchronization

Figure 6:
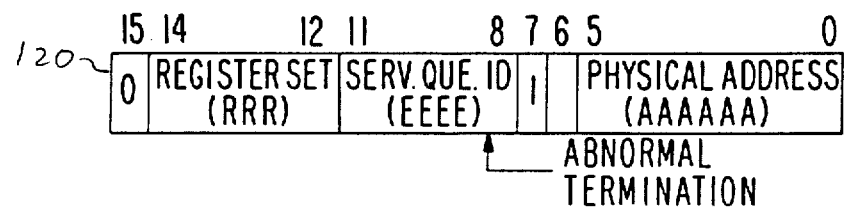
FIG. 6 is a diagram of the format of sequencer messages.

When this option is chosen the sequencer sends a microport message to the target task. The target task is specified by the task that executes the ACCESS instruction. The message is delivered in the sequencer format which is shown in FIG. 6.

The message (120) is 16-bits long and the high-order bit is always 0. The bottom six bits (0-5) of the lower byte of the message contain the physical address of the register set that was involved in the transfer. The bit above the register set physical address (bit 6 in the byte) contains the abnormal termination bit. This bit will be set by the sequencer if the sequencer operation termination abnormally. In the lower byte the top bit (bit 7) is always 1. The next four bits (8-11) identify which sequencer channel the message came from. The next three bits (12-14) contain the value the sequencer was passed as the reply register set. Since the programmer specifies the value of this field when he executes the ACCESS instruction, information other than the reply register set can be passed if desired.

The message is designed to be compatible with the move pointer instruction. By putting a move pointer instruction immediately after the receive, the register set that just participated in the transfer can be mapped into the logical space of the target task.

Register Set Based Synchronization

When this type of synchronization is requested, the sequencer will write the physical address of the involved register set into the 'reply register set' pointer of the 'reply task'. Both the 'reply register set' and the 'reply task' were specified to the sequencer when the request was started. When it writes the register set pointer it will also set the abnormal termination bit in that pointer if the access terminated abnormally. In all cases the register set pointer has its valid bit set (i.e., the register set is unlocked).

Local Bus Sequencer

All communications and transfers to and from the system side of the CP go through the Local bus Sequencer (LBS). This is used by both the EU and the cache.

Queuing Of LBS Requests

There are several mechanisms that control the use of the LBS (Local bus Sequencer) by the EU and the cache.

Access requests to system memory are processed by the Local Bus Sequencer (LBS). These requests are placed in one of two queues, the low-priority queue or the high-priority queue. The programmer specifies which queue by providing a channel number when he executes the ACCESS instruction. The lo-queue or low-queue is channel 14 and the high-queue is channel 15. Each of these queues is two deep and, as their names imply, any requests in the high-priority queue will be serviced before those in the low-priority queue.

Besides access requests, the LBS also handles cache-fill requests and so provides a cache-request queue, separate from the other two queues. The cache queue is three deep. The order of service between the cache queue and the access queues is round-robin, i.e., a request from the access queues is serviced, then a request from the cache queue, then the access queues again, etc.

Requests coming from the cache are generated either by a cache miss or a line prefetch. When a request comes from the cache the request is queued in the cache request queue. This queue is three deep and each entry can hold a request to fill a cache line. If the request is due to a cache miss, the task that caused the miss will be blocked and its Cache Blocked bit will be set. When the cache request is completed the task will be unblocked.

If the cache request queue is full and a task experiences a cache miss, the task is blocked and the Cache Queue Blocked bit is set. When any cache request is filled, the queue becomes available and all tasks that were blocked waiting for a slot will be unblocked. The task will then cause a cache miss again in order to get a cache request queued. No prefetches will be done if the cache request queue is full.

Data Alignment Restrictions

There are several restrictions on making computational subsystem memory access. Memory requests that cross 16-byte boundaries in the computational subsystem memory space are not allowed. Also, all the data associated with the request must come from or be put into one register set.

All bytes read or written through the LBS must have the same alignment in memory as they do in the register file. This means that the lower two bits of the physical address in memory and the lower two bits of the register address must be the same.

The LBS and the ACCESS instruction

An ACCESS instruction whose sequencer code is 14 or 15 will be directed to the LBS. Fourteen is the code for the low-priority channel, and 15 is the code for the high-priority channel.

Interagent Communication (IAC) reception

The IOS has a special IAC request line that can be setup to allow the CP to receive IACs. The line contains information about which task to notify (always task 7) when an IAC arrives and how to reply to the reply task (always message-based synchronization).

The IAC request line is separate from the other IOS lines and is hardwired to reply to task 7's microport when the IAC pin is triggered. The IAC channel is always enabled and valid. When an IC is received, task 7 will be notified via its microport.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. For use in an I/O processor including a register file (16) comprised of a plurality of register sets accessible indirectly through groups of register set pointers (50) assigned to each task running on said processor, a register set pointer (24) containing the physical address (52) of one of said register sets, an I/O bus sequencer (12), and a local bus sequencer (14) and, means (20) for decoding instructions, one of said instructions being an ACCESS instruction, said ACCESS instruction having a number of fields, one of said fields (41) being a pointer to a parameter register (42), said parameter register (42) being comprised of a number of fields, the improvement comprising:

A. means (25) for storing said parameter register fields including positions for storing:

a sequencer code (82) identifying one of said sequencers (12, 14) to or from which data is to be moved in a data transfer, a logical byte-type (92), first bits (53) of which specifying a particular register set pointer of said register set pointers (50) and second bits (54) of which specifying a byte address within a register set pointed to by the physical register set address (52) in said particular register set pointer, a reply register-set pointer (84) to register set in said register file (16) designated to receive a reply to said ACCESS instruction, and, length means (90) specifying the number of bytes to move in said data transfer;

B. instruction-register means including means for storing said parameter register;

C. a register set mapper (104) connected to said parameter register (42) responsive to said logical byte (92) for producing a physical register address (56) of said register file by combining said physical register set address (52) in said particular register set pointer specified by said first bits (53) with said second bits (54) specifying the byte address within the register set pointed to by the physical register set address (52) in said particular register set pointer;

said register set pointer (24) including a valid bit (51) and a block bit (55);

D. means for setting said block bit (55) upon the condition that said ACCESS instruction attempts to access a register set whose valid bit (51) is not set; and E. means for resetting said block bit (55) upon the condition that the task which is executing said ACCESS instruction attempts to access a register set whose block and valid bits are set.

2. The combination in accordance wtih claim 1 further comprising:

means in said register set mapper (104) for turning off said valid bit (51) of said register set pointer (24) as it is translated by said register-set mapper (104) so that the register set corresponding to said register set pointer is passed to the bus sequencer specified by said sequencer code (82).

3. The combination in accordance with claim 2 wherein said improvement further comprises:

means for writing the physical register address of reply data into the logical register-set pointer specified by said reply register-set pointer (84) in said parameter register (42), said reply register-set pointer corresponding to a reply task; and means for setting the valid bit (51) of said register set pointer (24) so that said reply task specified by said replay task pointer (80) will be given full access to the reply register set (84).

* * * * *